US012258813B2

(12) United States Patent
Henson et al.

(10) Patent No.: US 12,258,813 B2
(45) Date of Patent: Mar. 25, 2025

(54) QUICK RELEASE WINDOW COVERING SYSTEMS AND METHODS OF USING THE SAME

(71) Applicant: SecurShade Inc., Williston, VT (US)

(72) Inventors: Ayden R. Henson, Falmouth, ME (US); Donald R. Seib, III, Bryant Pond, ME (US); Aidan P. Trombley, Jeffersonville, VT (US); Jessica M. Zwolen, Colchester, VT (US)

(73) Assignee: SecurShade Inc., Williston, VT (US)

(*) Notice: Subject to any disclaimer, the term of this patent is extended or adjusted under 35 U.S.C. 154(b) by 370 days.

(21) Appl. No.: 17/732,161

(22) Filed: Apr. 28, 2022

(65) Prior Publication Data

US 2022/0349249 A1 Nov. 3, 2022

Related U.S. Application Data

(60) Provisional application No. 63/201,523, filed on May 3, 2021.

(51) Int. Cl.
*E06B 9/322* (2006.01)
*E06B 9/38* (2006.01)
*E06B 9/68* (2006.01)

(52) U.S. Cl.
CPC ................ *E06B 9/322* (2013.01); *E06B 9/38* (2013.01); *E06B 9/68* (2013.01); *E06B 2009/6809* (2013.01)

(58) Field of Classification Search
CPC ... E06B 9/322; E06B 9/38; E06B 9/68; E06B 2009/6809; E06B 2009/3222; E06B 2009/2627; F16D 11/14; F16D 21/08
See application file for complete search history.

(56) References Cited

U.S. PATENT DOCUMENTS

| | | | | | |
|---|---|---|---|---|---|
| 1,499,419 | A * | 7/1924 | Stevens | F16D 21/08 | 192/114 R |
| 1,718,752 | A * | 6/1929 | McCloud | E06B 9/68 | 160/9 |
| 3,789,905 | A * | 2/1974 | Saito | E06B 9/361 | 160/168.1 V |
| 4,257,192 | A * | 3/1981 | Bartholomew | E05F 11/405 | 49/140 |
| 4,644,990 | A * | 2/1987 | Webb, Sr. | E06B 9/32 | 160/5 |
| 5,261,372 | A * | 11/1993 | Traeger | F02M 59/38 | 74/625 |
| 5,605,185 | A * | 2/1997 | McKeon | A62C 2/10 | 160/133 |
| 5,611,386 | A * | 3/1997 | Wang | A47H 5/0325 | 160/331 |
| 5,855,141 | A * | 1/1999 | Chen | F16H 35/00 | 160/310 |

(Continued)

*Primary Examiner* — Abe Massad
*Assistant Examiner* — John W Hanes, Jr.
(74) *Attorney, Agent, or Firm* — Downs Rachlin Martin PLLC

(57) ABSTRACT

Quick release systems for window shades for selectively disengaging and engaging a window shade holding element with a remainder of a lift mechanism of the window shade. When engaged, the shade functions normally, and when disengaged, the covering material of the window shade falls under the pull of gravity to an open position.

2 Claims, 5 Drawing Sheets

(56) References Cited

U.S. PATENT DOCUMENTS 6,388,404 B1 * 5/2002 Schnebly ............ F21V 33/0016 318/16
6,474,393 B1 * 11/2002 Welfonder .............. E06B 9/368 160/177 V
7,857,030 B2 * 12/2010 Cheng ..................... E06B 9/322 160/84.02
8,033,374 B2 * 10/2011 Gunton ................. E05F 15/603 160/331
9,241,590 B2 1/2016 Clements et al.
10,030,443 B2 * 7/2018 Clements .................. E06B 9/68
10,221,615 B2 * 3/2019 Meyerink ............... E06B 7/096
11,220,858 B2 1/2022 Clements et al.
2003/0221799 A1 * 12/2003 Cross ...................... E06B 9/322 160/168.1 P
2004/0182526 A1 * 9/2004 Strand ..................... E06B 9/262 160/170
2005/0072635 A1 * 4/2005 Toti ......................... E06B 9/262 185/39
2005/0087394 A1 * 4/2005 Toti ......................... E06B 9/322 185/39
2005/0205219 A1 * 9/2005 Hsu .......................... E06B 9/90 160/170
2008/0271563 A1 * 11/2008 Liu .......................... E06B 9/68 74/625
2008/0314530 A1 * 12/2008 Cheng ..................... E06B 9/322 160/170
2015/0136342 A1 * 5/2015 Clements ................ E06B 9/322 160/368.1
2015/0204387 A1 * 7/2015 Holmes ................... F16D 15/00 192/69.5
2016/0281794 A1 * 9/2016 Pawlakowitsch ....... F16D 11/14
2017/0067540 A1 * 3/2017 Pyrhonen ................ F16D 11/10
2017/0167194 A1 * 6/2017 Freberg ...................... E06B 9/90
2017/0247930 A1 * 8/2017 Heidrich ............... E05F 15/603
2018/0337518 A1 * 11/2018 Zhu ...................... H02B 11/133
2019/0210448 A1 * 7/2019 Forsberg ................. F16D 11/14
2020/0330893 A1 * 10/2020 Jensen ................... A63H 31/08
2021/0061452 A1 * 3/2021 Olson .................. B64D 27/026
2022/0097793 A1 * 3/2022 Song ....................... F16D 11/14

* cited by examiner

QUICK RELEASE WINDOW COVERING SYSTEMS AND METHODS OF USING THE SAME

RELATED APPLICATION DATA

This application claims the benefit of priority of U.S. Provisional Patent Application Ser. No. 63/201,523, filed May 3, 2021, and titled Quick Release Window Covering System, which is incorporated by reference herein in its entirety.

FIELD OF THE DISCLOSURE

The present disclosure generally relates to the field of window covering systems. In particular, the present disclosure is directed to window covering systems with quick release capability and methods of using the same.

BACKGROUND

Window shades are common in schools and offices. Individual window shades are controlled using lift chords or motors to control a position of the shade rail. In some instances, such as in emergency situations, a user may want to quickly close the window shade, for example, to eliminate the ability to see through the window for security reasons.

SUMMARY OF THE DISCLOSURE

In one implementation, the present disclosure is directed to a quick release module for a window shade. The quick release module includes an electromechanical actuator; and a gear assembly that includes a sliding gear assembly that includes a sliding gear and a mesh gear coupled to a sliding shaft; a first gear configured to be coupled to a holding element shaft of a window shade; and a spool gear configured to be coupled to a spool shaft of a window shade; wherein the gear assembly is configured to transition between a coupled state, in which the sliding gear assembly is in a first axial position in which the mesh gear meshes with the first gear and the sliding gear meshes with the spool gear to thereby transfer a torque from the first gear to the spool gear, and a decoupled state, in which the sliding gear assembly is in a second axial position in which the mesh gear is decoupled from the first gear and/or the sliding gear is decoupled from the spool gear; wherein the electromechanical actuator is configured to move the sliding gear assembly from the first axial position to the second axial position in response to receipt of a quick release signal.

In another implementation, the present disclosure is directed to a window shade, which includes a holding element configured to transmit a torque to a holding element shaft; a covering material and a bottom rail; a headrail that defines an interior volume; a lift mechanism located in the interior volume and coupled to the covering material and bottom rail, the lift mechanism including a spool shaft; and the quick release module of claim 1, wherein when the gear assembly is in the coupled state the quick release module transmits the torque from the holding element shaft to the spool shaft and when the gear assembly is in the decoupled state the holding element is decoupled from the lift mechanism, thereby allowing the covering material and bottom rail to fall under the pull of gravity to an extended position.

In yet another implementation, the present disclosure is directed to a method of operating a window shade that includes a holding element, a lift mechanism, and a covering material. The method includes decoupling the holding element from the lift mechanism in response to receipt of a quick release signal to thereby allow a covering material to fall under the pull of gravity to an extended position; wherein the decoupling includes a linear movement of a sliding gear assembly from a first position to a second position to thereby decouple a mesh gear of the sliding gear assembly from a first gear and/or a second gear of the sliding gear assembly from a spool gear, the first gear coupled to the holding element and the spool gear coupled to a shaft of the lift mechanism.

BRIEF DESCRIPTION OF THE DRAWINGS

For the purpose of illustrating the disclosure, the drawings show aspects of one or more embodiments of the disclosure. However, it should be understood that the present disclosure is not limited to the precise arrangements and instrumentalities shown in the drawings, wherein.

DETAILED DESCRIPTION

Aspects of the present disclosure include quick release systems for window shades. The disclosed systems can be used to selectively disengage and engage a window shade holding element, such as a clutch, electric motor, or cordless motor, with a remainder of a lift mechanism of the window shade. When engaged, the shade functions normally, and when disengaged, the covering material of the window shade falls under the pull of gravity to a closed position. Quick release modules of the present disclosure are capable of being installed in a range of different window coverings, such as a cellular shades and roller shades. These include top down-bottom up shades and blackout shades. Systems of the present disclosure may be adapted to all sizes of window treatments. Aspects of the present disclosure may be combined with any of the aspects of U.S. Pat. No. 9,241,590, titled Quick-release control system for architectural opening covering, or U.S. patent application Ser. No. 16/690,355, titled Roller Blind And Control Device Thereof, each of which is incorporated herein in its entirety.

Figure 1:
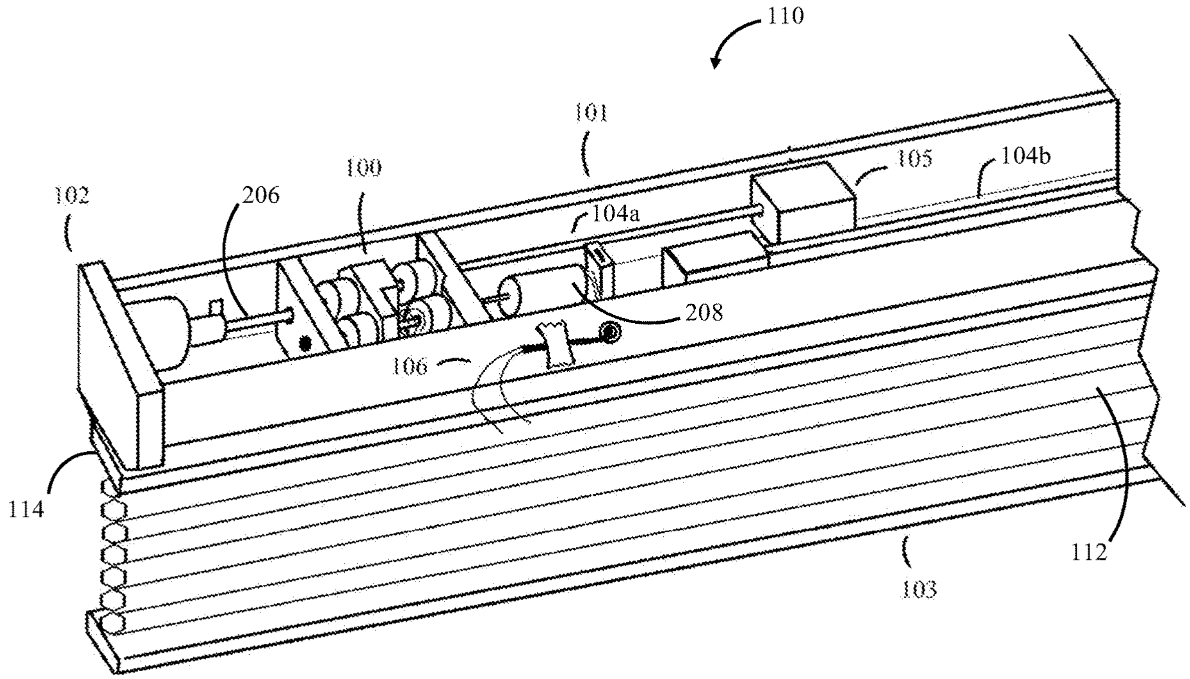
FIG. 1 is a perspective view of a portion of an architectural opening covering control system having quick-release capabilities.

FIG. 1 is a perspective view of a portion of one example of a window shade 110 that includes a quick release module 100 in an engaged state. Quick release module 100 is disposed in a headrail 101 of window shade 110. Window shade 110 also includes a holding element in the form of a clutch 102, which controls a position of a bottom rail 103 when operating in a normal operation mode with quick release module 100 in an engaged state. Window shade 110 includes a lift mechanism that includes spool shafts 104 coupled to inner cords (not illustrated) which are wound around a spool located in spool boxes 105 (one illustrated) as is known in the art of cellular shades. During normal operation movement of a lift chord (not illustrated) coupled to clutch 102 causes shaft 206 to rotate. Gears 202-205 of quick release module 100 transfer the rotational motion of shaft 206 to spool shaft 104*a*, causing spool shaft 104*a* to rotate, thereby shortening or lengthening a length of the inner chords extending from spool box 105, and a corresponding distance of bottom rail 103 from headrail 101, thereby raising or lowering the shade. Spool shaft 104*b* is coupled to a second clutch (not illustrated) located at an opposite end of headrail 101 and controls a position of top rail 114.

In an emergency situation, a user may want to quickly close the window shade 110 and do so faster than would be possible by pulling the lift cord (not illustrated) attached to clutch 102, or in the case of a motorized lift mechanism, faster than the motor of the lift mechanism would lower the shade. Also, a user may want to quickly close window shade 110 from a remote location without needing to go close to the window shade and associated window for safety reasons, such as to stay out of sight from an assailant. The ability to remotely close the window shade also provides the ability to remotely close multiple window shades at the same time, such as all of the window shades in a room, such as a classroom of a school, or all of the window shades in an entire building, such as an entire school, may be quickly closed at the same time.

In the illustrated example, quick release module 100 provides the ability to quickly close window shade 110 and to do so from a remote location. In an example, each window shade in a room or each window shade in a building may include one of quick release module 100. The window shade 110 may be originally manufactured with quick release module 100 or may be modified after purchase to include the quick release module.

In an example, quick release module 100 is configured to receive a quick release signal, such as an electrical voltage or current via wires 106. In other examples the information signal may be provided through various other means, for example the motion of a cable or pressure wave. Quick release signal triggers quick release module 100 to disengage.

The figures of the present disclosure illustrate a window shade 110 that utilizes clutch 102 as the holding element that applies a holding torque to spool shaft 104 to prevent the spool shaft from rotating and for controlling the rotation of the spool shaft in response to a user input. Other examples of holding elements known in the art of window shades are electric motors and cordless motors. As is known in the art, cordless motors are not electric motors but spring-driven mechanisms located in the headrail of a cordless shade that take up and let out the inner cords as a user raises and lowers the bottom or top rail. Quick release module 100 may be applied to window shades with holding elements in the form of electric motors or cordless motors for quickly and remotely decoupling the holding element from the remainder of the lift mechanism to allow the window shade to fall under the full of gravity to an extended position.

Figure 2:
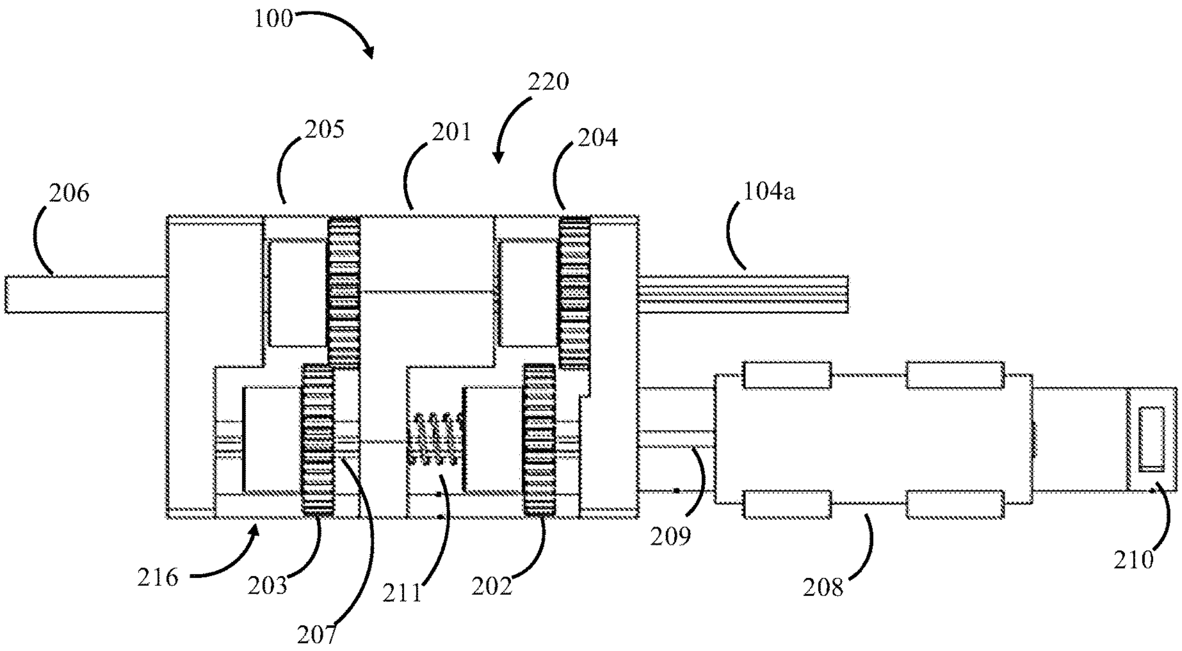
FIG. 2 is a top view of a portion of a quick release system in a disengaged state.

FIG. 2 shows quick release module 100 in a disengaged state resulting in clutch 102 being decoupled from the spool shaft 104*a*. When quick release module 100 is in the coupled state, clutch 102 applies a holding torque that prevents spool shaft 104*a* from turning, resisting the weight of bottom rail 103 and covering material 112. When quick release module 100 is transitioned to the decoupled state shown in FIG. 2, spool shaft 104*a* is decoupled from clutch 102, which allows the spool shaft to spin freely, resulting in the weight of bottom rail 103 and covering material 112 causing the spool shaft to rotate and inner cords to unwind and the bottom rail and covering material to extend towards a fully extended position under the pull of gravity, thereby quickly covering the associated window or other opening where window shade 110 is installed. In other examples, quick release module 100 may be incorporated in a motorized shade in which the quick release module is configured to couple and decouple the motor from the spool shaft 104 or other lift mechanism component.

Quick release module 100 includes a gear assembly 220 that includes a plurality of gears rotatably disposed in a gear rack 201. Gear assembly 220 includes a sliding gear assembly 216 that includes a sliding gear 202 and a mesh gear 203 coupled to a sliding shaft 207. Gear assembly also includes a first gear 205 coupled to clutch shaft 206, and a spool gear 204 coupled to spool shaft 104*a*. First gear 205 and spool gear 204 are each rotatably coupled to gear rack 201 and the gear rack maintains them in a fixed axial position. Mesh gear 203, sliding gear 202 and sliding shaft 207 are rotatably coupled to gear rack 201 and are also slidably disposed in the gear rack and configured to move in an axial direction. Mesh gear 203, sliding gear 202 and sliding shaft 207 are resiliently biased by a spring 211 to the coupled state in which the plurality of gears are engaged for transmitting torque from clutch shaft 206 to spool shaft 104.

Quick release module 100 also includes an electromechanical actuator in the form of a linear solenoid 208. Solenoid 208 is configured to move a solenoid shaft 209 in a linear motion from a retracted position to the extended position shown in FIG. 2. Solenoid shaft 209 is configured to be coupled to or engage sliding shaft 207. Movement of the solenoid shaft 209 to the extended position counteracts the force applied by spring 211 and displaces sliding shaft 207 to the position shown in FIG. 2, which disengages sliding gear 202 coupled to sliding shaft 207 from spool gear 204 coupled to spool shaft 104. In the illustrated example solenoid 208 provides linear actuation, however, other actuation mechanisms could be used. For example, an electromagnet, servo motor or various forms of stored energy. Solenoid shaft 209 impacts sliding shaft 207, applying a force in an axial direction. Sliding gear 202 and a mesh gear 203 are fixed to sliding shaft 207 using, for example, a set screw to maintain their axial and rotational position relative to the sliding shaft during disengagement. In the illustrated example, mesh gear 203 remains in engagement and interfaces with a first gear 205 when quick release module 100 is in the disengaged state to maintain the angular position of the sliding shaft 207. In the illustrated example, this is achieved by reducing the distance the sliding gear must travel to unmesh using a slight offset on the interior face of the gear rack 201. In other examples the teeth of mesh gear 203 and/or first gear 205 may have a greater width than the teeth of sliding gear 202 and/or spool gear 204 so that for a given linear movement of sliding shaft 207, the sliding and spool gears will disengage or decouple while the mesh gear and first gear remain engaged.

Figure 3:
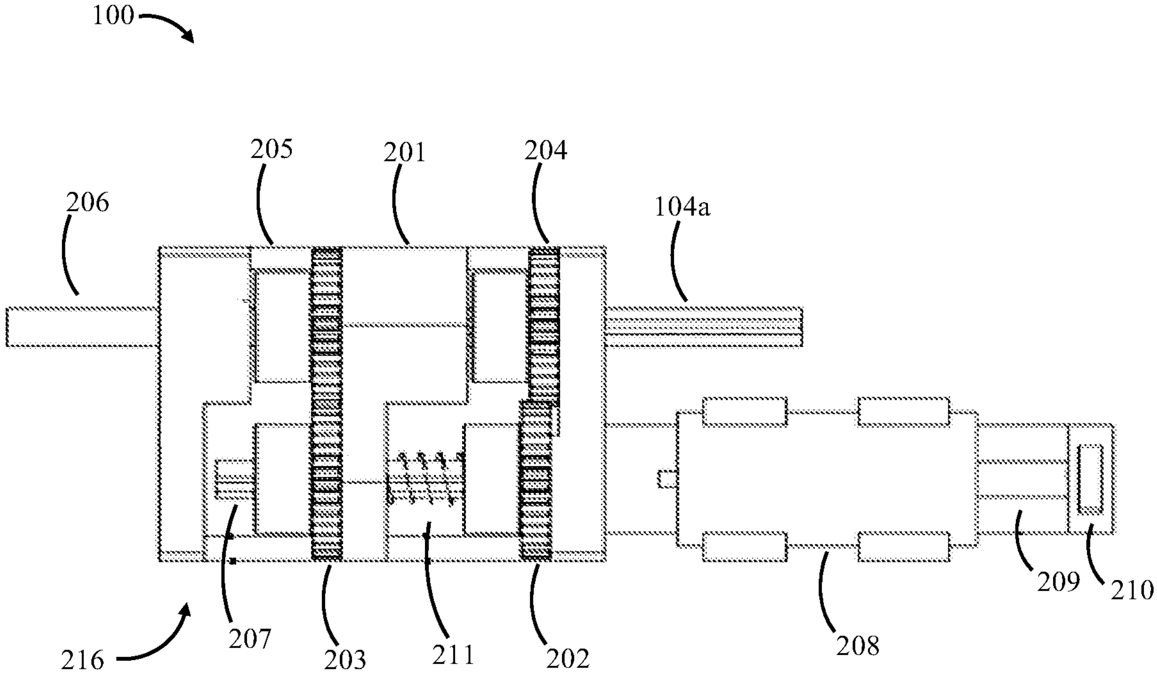
FIG. 3 is a top view of the system of FIG. 2 in an engaged state.

FIG. 3 shows quick release module 100 in the engaged state. The engaged state is maintained as the neutral state by spring 211, which applies a force on a face of sliding gear 202 to maintain the engaged position. In the coupled state spool gear 204 and sliding gear 202 are meshed, allowing rotational motion of the clutch via shaft 206 to be transmitted to the spool shaft 104. The solenoid shaft 209 is retracted and in the illustrated example a magnet 210 is utilized to maintain the shaft in the retracted state to provide a more consistent and reliable actuation.

In the engaged state, torque transmitted by clutch 102 through shaft 206 is transmitted from first gear 205 to mesh gear 203. Mesh gear 203 transmits the torque to sliding gear 202 via sliding shaft 207, and sliding gear 202 transmits the torque to spool gear 204 which in turn transmits the torque to spool shaft 104*a* and the remainder of the bottom rail lift assembly. When a user pulls a lift cord coupled to clutch 102, the clutch converts the axial force of the lift cord to a rotational force or torque that is transmitted along shaft 206 to raise or lower bottom rail 103 and covering material 112. When a user stops pulling the lift cord the clutch applies a holding torque, holding spool shaft 104 in a fixed position, the holding torque sufficient to resist the weight of the lower bottom rail 103 and covering material 112.

When quick release module 100 is transitioned to the disengaged state by movement of solenoid shaft 209, sliding gear assembly 216 is moved in an axial direction, thereby decoupling first gear 205 from spool gear 204. With first gear 205 and spool gear 204 decoupled, the clutch holding torque is removed from spool shaft 104*a*, thereby allowing bottom rail 103 and covering material 112 to fall under the pull of gravity to the extended position.

Figure 4:
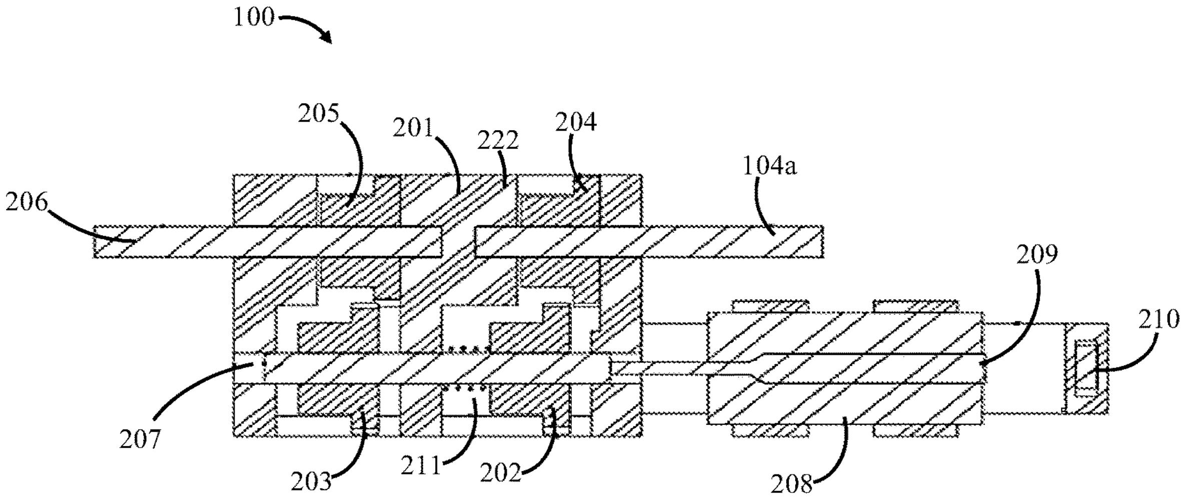
FIG. 4 is a cross-sectional view of the system of FIGS. 1-3.

FIG. 4 is a section-view of quick release module 100 in the disengaged state. Gear rack 201 is designed to contain the rotating components of quick release module 100. Sliding shaft 207 is supported by three colinear holes to ensure the shaft does not wobble, ensuring the gears mesh. The spool shaft 104*a* and clutch shaft 206 are each contained with corresponding blind holes located on opposed sides of an internal wall 222 of gear rack 201. The blind holes allow for shafts 206 and 104*a* to independently rotate. The plurality of colinear holes are located along a first axis and the first and second blind holes are located along a second axis, wherein the second axis is offset from and parallel to the first axis, wherein sliding shaft 207 is disposed in and rotatably coupled to the plurality of colinear holes and configured to slide relative to the holes along the first axis, wherein a first end of the clutch shaft 206 is disposed in the first blind hole and a first end of the spool shaft 104*a* is disposed in the second blind hole.

Figure 5:
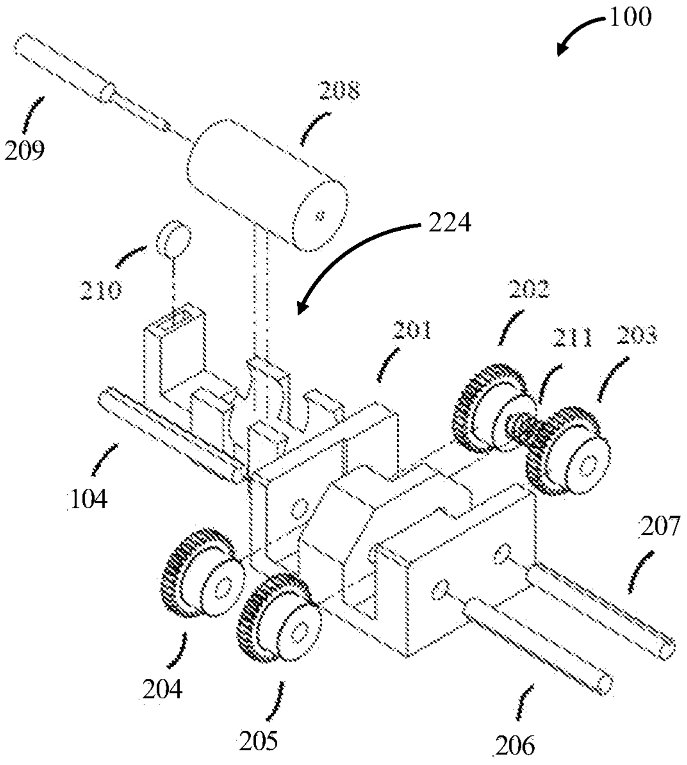
FIG. 5 is an isometric exploded view of the quick release system of FIGS. 1-4.

FIG. 5 is an exploded perspective view of quick release module 100. The solenoid 208 is press fit into a solenoid slot 224 in gear rack 201. Slot 224 is spaced sufficiently far from sliding gear 202 that the greatest force generated by the solenoid is applied to the gear. Solenoid 208 is held in place using two semi-ring-shaped brackets. The jaws of the bracket apply a force to the body of solenoid 208 forming a friction fit. Solenoid 208 is held rigidly to ensure the force it generates is concentrated solely on disengaging the gears.

The foregoing has been a detailed description of illustrative embodiments of the disclosure. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this disclosure. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present disclosure. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this disclosure.

What is claimed is:

1. A quick release module for a window shade, the quick release module comprising:

an electromechanical actuator; and a gear assembly that includes:

a sliding gear assembly that includes a sliding gear and a mesh gear coupled to a sliding shaft;

a first gear configured to be coupled to a holding element shaft of a window shade;

a spool gear configured to be coupled to a spool shaft of a window shade;

wherein the gear assembly is configured to transition between a coupled state, in which the sliding gear assembly is in a first axial position in which the mesh gear meshes with the first gear and the sliding gear meshes with the spool gear to thereby transfer a torque from the first gear to the spool gear, and a decoupled state, in which the sliding gear assembly is in a second axial position in which the mesh gear is decoupled from the first gear and/or the sliding gear is decoupled from the spool gear;

wherein the electromechanical actuator is configured to move the sliding gear assembly from the first axial position to the second axial position in response to receipt of a quick release signal; and a gear rack that includes a plurality of colinear holes located along a first axis and first and second blind holes located along a second axis, wherein the second axis is offset from and parallel to the first axis, wherein the sliding shaft is disposed in and rotatably coupled to the plurality of colinear holes and configured to slide relative to the holes along the first axis, wherein a first end of the holding element shaft is disposed in the first blind hole and a first end of the spool shaft is disposed in the second blind hole.

2. The quick release module of claim 1, wherein the gear rack includes an internal wall, wherein one of the plurality of colinear holes and the first and second blind holes are located in the internal wall, wherein the quick release module further comprises a spring that surrounds the sliding shaft and extends from the internal wall to the sliding gear to thereby resiliently bias the sliding gear assembly to the first axial position.

* * * * *